Patented Dec. 14, 1943

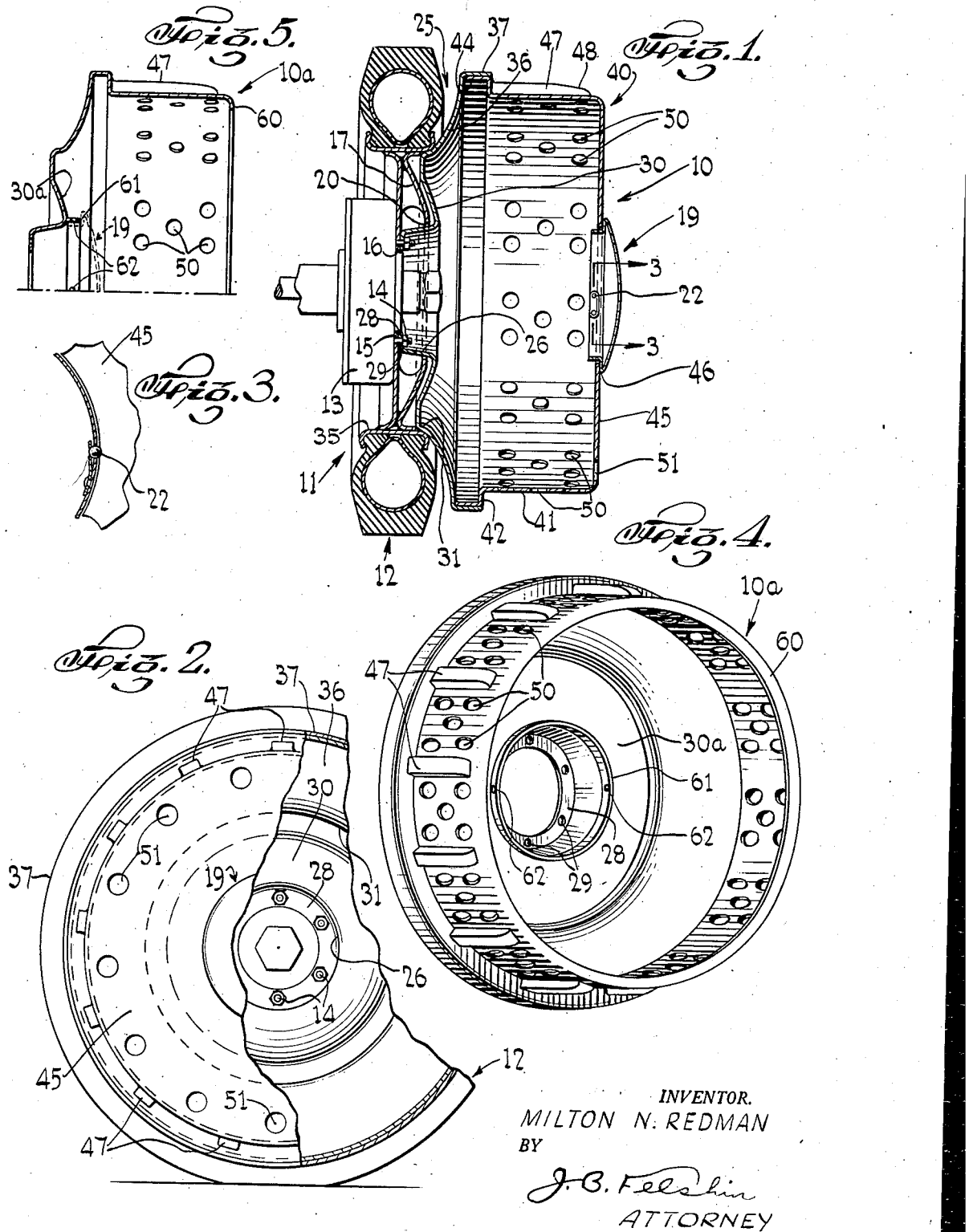

2,336,959

UNITED STATES PATENT OFFICE 2,336,959

AUXILIARY WHEEL

Milton N. Redman, Tompkins Corners, N. Y.

Application February 21, 1942, Serial No. 431,831

17 Claims. (Cl. 301—38)

This invention relates to auxiliary wheels. It is particularly directed to an auxiliary wheel attachable to a tired vehicle wheel and the like wheels.

An object of this invention is to provide an auxiliary wheel of the character described, having means to provide traction in the event that the tire on the main wheel sinks into soft ground or mud, the construction being such that the auxiliary wheel is well off the ground as long as the tires are inflated and the main wheels do not sink into the mud.

A further object of this invention is to provide an auxiliary wheel of the character described, having means to contact the ground in the event that the tire on the wheel to which the auxiliary wheel is attached, becomes deflated.

Another object of this invention is to provide an auxiliary wheel of the character described, which may be attached to the brake drum by the same bolts which attach the main wheel to the brake drum. In the event the bolts are not sufficiently long, longer bolts may be substituted.

Yet another object of this invention is to provide an auxiliary wheel of the character described, comprising a cylindrical drum provided with spaced cleats to engage the ground in the event that the vehicle wheel to which the auxiliary wheel is attached, sinks into the ground, to provide traction, the auxiliary wheel being furthermore provided with an annular flange or rim extending beyond the cleats to engage the ground in the event that the tire is deflated, so that the vehicle will ride upon said rim, thus preventing the cleats from touching the ground. With such construction, the cleats contact the ground only when the vehicle is running in soft ground. The annular rim or flange is located on the side of the drum adjacent the tire, and said cleats decrease in height at the outer side of the drum, to aid in dropping mud off the cleats.

Still a further object of this invention is to provide an auxiliary wheel of the character described, comprising a drum having holes therein to permit sand or water to pour out through the holes, so that it will not collect in said drum.

A still further object of this invention is to provide an auxiliary wheel of the character described, having a portion overlying the outer side of the vehicle wheel, to serve as a protection for said vehicle wheel from explosives, rocks, or the like objects.

Still another object of this invention is to provide an auxiliary wheel of the character described, having means to support the hub cap which is ordinarily mounted on the vehicle wheel, to serve as a protection for the hub of the axle.

Yet a further object of this invention is to provide an auxiliary wheel of the character described, having a portion engaging the inner periphery of the tire receiving rim of the vehicle wheel, whereby to transmit load applied to the auxiliary wheel onto the vehicle wheel, and to firmly fix the auxiliary wheel to said vehicle wheel.

A still further object of this invention is to provide a strong, durable and compact auxiliary wheel of the character described, which shall be relatively inexpensive to manufacture, which shall be easy to mount and demount, and which may be applied to vehicle wheels now in use, and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a vertical, axial, cross-sectional view through a tired wheel of a vehicle, with an auxiliary wheel, embodying the invention, attached thereto;

Fig. 2 is a side elevational view thereof, with parts broken away and in cross-section;

Fig. 3 is a cross-sectional view taken on line 3—3 of Fig. 1;

Fig. 4 is a perspective view of an auxiliary wheel, embodying the invention, and illustrating a modified construction; and Fig. 5 is a partial, elevational, cross-sectional view of the auxiliary wheel shown in Fig. 4.

Referring now in detail to the drawing, 10 designates an auxiliary wheel embodying the invention, mounted on a wheel 11 of a vehicle, provided with a tire 12. The wheel 11 is of usual construction, and is attached to the brake drum 13 by the usual bolts 14, passing through the usual bolt openings 15 in the hub 16 of said wheel.

The wheel 11 is of the disc type, being provided with an outer protector or decorative disc 17, as illustrated in the drawing.

When the auxiliary wheel 10 is removed, the bolts 14 attach the wheel 11 directly to the brake drum 13 in the well known way, and a hub cap, such as designated by numeral 19 of the drawing, is mounted on the annular rim 20 of the disc 17, being retained thereon by spring pressed balls 22. When the auxiliary wheel 10 is mounted on the wheel 11, the hub cap 19 is removed and the nuts on the bolts are taken off to permit the auxiliary wheel to be mounted on the main wheel 11, as will appear hereinafter.

The auxiliary wheel 10 comprises a member 25 having a hub portion 26, passing through the central opening in the disc 17, and formed at its inner end with an inwardly extending flange 28, having bolt openings 29 registering with the bolt openings 15, and receiving the bolts 14, for attaching the auxiliary wheel to the main wheel.

Extending from the hub portion 26, is an annular wall portion 30 formed at its outer end with an annular shoulder 31, engaging the inner surface of the annular tire carrying rim portion 35 of the wheel 11.

Extending outwardly from the annular shoulder 31, is an annular, outwardly curved wall portion 36, spaced from the tire 12. At the outer end of said portion 36, is a cylindrical portion 37 of less diameter than the outer diameter of the tire.

Fixed to member 25 is a second member 40, comprising a cylindrical drum portion 41 of less diameter than cylindrical portion 37. Extending outwardly from the inner end of the drum is an annular flange 42, from which there extends a cylindrical flange 44, received within the cylindrical flange 37. The contacting cylindrical flanges 37, 44 may be welded together or fixed together in any suitable manner.

Extending from the outer end of the drum 41, is a flat, circular wall portion 45, disposed in a vertical plane and formed with a central opening 46, of the same diameter as the rim 20 of wall 17. The hub cap 19 may be snapped into the opening 46.

The drum portion 41 is formed with a plurality of parallel, longitudinal cleats 47. The height of the cleats 47 is such that the upper edges thereof are disposed inwardly of the outer surface of cylindrical flange 37. The cleats 47 are preferably tapered or rounded downwardly, or decrease in height at their outer ends, as indicated at 48. The drum 41 is furthermore formed with a plurality of openings 50 between the cleats, and wall 45 is also formed with a plurality of openings 51, for the purpose hereinafter appearing.

It will now be understood that when the vehicle is running on hard ground, the auxiliary wheel does not come into contact with the ground, unless the tire 12 becomes deflated, in which event, the auxiliary wheel will run on the flange 37. In the event however, that the vehicle runs on soft ground or mud, and the tire 12 sinks into the ground, the cleats 47 will engage the ground and add traction to the wheel. In the event that the tire 12 is deflated, flange 37 contacts the ground. If the ground is hard, the cleats 47 likewise will not touch the ground, so that the cleats only become effective when the wheels are running in soft ground or mud. Water or mud may pour out of the drum through the openings 50 and 51. The auxiliary wheel serves as protection for the wheel 11 and its tire 12, so that the auxiliary wheel may be used for military vehicles, and for the like use.

It will be noted that no structural changes need be made in the wheel 11. The auxiliary wheel may be carried in the vehicle as extra equipment, and in the event, the vehicle gets stuck in the mud, the auxiliary wheel may be mounted to help extricate the vehicle from the mud.

It will be noted that the auxiliary wheel may be attached to wheels of vehicles now in use, by the same bolts which attach the vehicle wheels to the brake drum. It will be noted furthermore, that the auxiliary wheel is supported on the tire supporting rim of the wheel due to engagement of shoulder 31 with portion 35 of the wheel.

It will be noted that the wall 36 is curved sufficiently to permit the tire to expand where it contacts the ground without contacting the auxiliary wheel.

In Figs. 4 and 5 of the drawing, there is shown an auxiliary wheel 10a embodying the invention and illustrating a modified construction. In the wheel 10a, the wall 45 is omitted, the same being replaced by a small annular flange 60 on the drum. Furthermore, instead of making the auxiliary wheel of two parts 25 and 40, it is made as one integral member in the modification illustrated in Figs. 4 and 5.

Furthermore, the wall 30a of wheel 10a, which corresponds to wall 30 of wheel 10, is formed with a cylindrical flange 61 having diametrically opposed openings 62. The purpose of the flange 61 is to permit the hub cap 19 to be snapped thereon so that the balls 22 will snap into the openings 62.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. An auxiliary wheel for a tired wheel attached to the brake drum on an axle of a vehicle, comprising a portion having bolt openings to receive the bolts which attach the main wheel to the brake drum, an annular portion of less diameter than the outer diameter of the tire of said main wheel, a drum portion of a diameter less than the diameter of said annular portion, extending outwardly of said annular portion, and a plurality of angularly spaced, parallel, longitudinal cleats on said drum, the upper edges of said cleats being disposed radially inwardly of the outer edge of said annular portion, and said auxiliary wheel having an annular shoulder adapted to engage the tire receiving rim of said main wheel, said drum being formed with a plurality of openings between said cleats, said drum having at its outer end, an annular, transverse wall formed with a central opening adapted to receive the hub cap of the main wheel.

2. An auxiliary wheel comprising a drum and an annular flange at one end of the drum extending outwardly of the drum, and concentric therewith, and a plurality of angularly spaced cleats on said drum, the upper edges of said cleats being disposed inwardly of said annular member, said cleats decreasing in height only towards their outer ends, and extending to the flange at their inner ends.

3. An auxiliary wheel adapted to be attached to a vehicle wheel, and having means to receive the attaching means which attaches the vehicle wheel to the brake drum on the axle of the vehicle, said auxiliary wheel having an annular portion to engage the tire receiving rim of the vehicle wheel, and an annular portion of less diameter than the outer diameter of the tire of the vehicle wheel.

4. An auxiliary wheel adapted to be attached to a vehicle wheel, and having means to receive the attaching means which attaches the vehicle wheel to the brake drum on the axle of the vehicle, said auxiliary wheel having an annular portion to engage the tire receiving rim of the vehicle wheel, and an annular portion of less diameter than the outer diameter of the tire of the vehicle wheel, and said auxiliary wheel having a drum of less diameter than the last mentioned annular portion and extending outwardly therefrom.

5. An auxiliary wheel adapted to be attached to a vehicle wheel, and having means to receive the attaching means which attaches the vehicle wheel to the brake drum on the axle of the vehicle, said auxiliary wheel having an annular portion to engage the tire receiving rim of the vehicle wheel, and an annular portion of less diameter than the outer diameter of the tire of the vehicle, and said auxiliary wheel having a drum of less diameter than the last mentioned annular portion and extending outwardly therefrom, and cleats on said drum.

6. An auxiliary wheel adapted to be attached to a vehicle wheel, and having means to receive the attaching means which attaches the vehicle wheel to the brake drum on the axle of the vehicle, said auxiliary wheel having an annular portion to engage the tire receiving rim of the vehicle wheel, an annular portion of less diameter than the outer diameter of the tire of the vehicle wheel, and said auxiliary wheel having a drum of less diameter than the last mentioned annular portion and extending outwardly therefrom, and cleats on said drum, said cleats terminating inwardly of the periphery of said annular portion and decreasing in height toward the outer end of the drum, and said cleats extending to said last mentioned annular portion.

7. In combination, a main tired wheel adopted to be attached to a brake drum on an axle of a vehicle, comprising a tire receiving rim and a portion formed with bolt holes to receive bolts for attaching said wheel to the brake drum, an auxiliary wheel comprising a portion contacting the outer side of said main wheel and having holes registering with said holes of said main wheel, an annular portion of less diameter than the outer diameter of the tire of said main wheel, and a drum portion of a diameter less than the diameter of said annular portion, extending outwardly of said annular portion.

8. In combination, a main tired wheel adopted to be attached to a brake drum on an axle of a vehicle, comprising a tire receiving rim and a portion formed with bolt holes to receive bolts for attaching said wheel to the brake drum, an auxiliary wheel comprising a portion contacting the outer side of said main wheel and having holes registering with said holes of said main wheel, an annular portion of less diameter than the outer diameter of the tire of said main wheel, and a drum portion of a diameter less than the diameter of said annular portion, extending outwardly of said annular portion, and a plurality of angularly spaced, parallel, longitudinal cleats on said drum, the upper edges of said cleats being disposed radially inwardly of the outer edge of said annular portion.

9. In combination, a main tired wheel adopted to be attached to a brake drum on an axle of a vehicle, comprising a tire receiving rim and a portion formed with bolt holes to receive bolts for attaching said wheel to the brake drum, an auxiliary wheel comprising a portion contacting the outer side of said main wheel and having holes registering with said holes of said main wheel, an annular portion of less diameter than the outer diameter of the tire of said main wheel, a drum portion of a diameter less than the diameter of said annular portion, extending outwardly of said annular portion, a plurality of angularly spaced, parallel, longitudinal cleats on said drum, the upper edges of said cleats being disposed radially inwardly of the outer edge of said annular portion, and said auxiliary wheel having an annular shoulder engaging the tire receiving rim of said main wheel.

10. In combination, a main tired wheel adopted to be attached to a brake drum on an axle of a vehicle, comprising a tire receiving rim and a portion formed with bolt holes to receive bolts for attaching said wheel to the brake drum, an auxiliary wheel comprising a portion contacting the outer side of said main wheel and having holes registering with said holes of said main wheel, an annular portion of less diameter than the outer diameter of the tire of said main wheel, a drum portion of a diameter less than the diameter of said annular portion, extending outwardly of said annular portion, a plurality of angularly spaced, parallel, longitudinal cleats on said drum, the upper edges of said cleats being disposed radially inwardly of the outer edge of said annular portion, and said auxiliary wheel having an annular shoulder engaging the tire receiving rim of said main wheel, said drum being formed with a plurality of uncovered openings between said cleats.

11. An auxiliary wheel comprising a drum and an annular flange at one end of the drum extending outwardly of the drum, and concentric therewith, and a plurality of angularly spaced cleats on said drum, the upper edges of said cleats being disposed inwardly of said annular member, said cleats decreasing in height only towards their outer ends, and extending to the flange at their inner ends, said auxiliary wheel having an annular shoulder adapted to engage an inner surface of the tire carrying rim of the wheel to which the auxiliary is attached.

12. An auxiliary wheel adapted to be attached to a vehicle wheel, and having means to receive the attaching means which attaches the vehicle wheel to the brake drum on the axle of the vehicle, said auxiliary wheel having an annular portion to engage the tire receiving rim of the vehicle wheel, an annular portion of less diameter than the outer diameter of the tire of the vehicle wheel, and said auxiliary wheel having a drum of less diameter than the last mentioned annular portion and extending outwardly therefrom, cleats on said drum, said cleats terminating inwardly of the periphery of said annular portion, and decreasing in height toward the outer end of the drum, said cleats extending to said last mentioned annular portion, and said drum being formed with uncovered openings between said cleats.

13. An auxiliary wheel adapted to be attached to a vehicle wheel, and having means to receive the attaching means which attaches the vehicle wheel to the brake drum on the axle of the vehicle, said auxiliary wheel having an annular portion to engage the tire receiving rim of the vehicle wheel, an annular portion of less diameter than the outer diameter of the tire of the vehicle wheel, and said auxiliary wheel having a drum of less diameter than the last mentioned annular portion and extending outwardly therefrom, cleats on said drum, said cleats terminating inwardly of the periphery of said annular portion, and decreasing in height toward the outer end of the drum, said cleats extending to said last mentioned annular portion, and said drum being formed with uncovered openings between said cleats, said drum having a radially, inwardly extending flange at its outer end.

14. In combination, a main tired wheel adapted to be attached to a brake drum on an axle of a vehicle, comprising a tire receiving rim, and a portion formed with bolt holes to receive bolts for attaching said wheel to the brake drum, an auxiliary wheel comprising a portion contacting the outer side of said main wheel and having holes registering with said holes of said main wheel, a portion extending from the first portion of the auxiliary wheel and contacting the rim of the main wheel, a portion extending radially outwardly and to one side of the main wheel, a cylindrical portion extending from the outwardly extending portion and of less diameter than the outer diameter of the tire, a portion extending radially inwardly of said cylindrical portion, and a cylindrical drum portion of less diameter than said first cylindrical portion.

15. In combination, a main tired wheel adapted to be attached to a brake drum on an axle of a vehicle, comprising a tire receiving rim, and a portion formed with bolt holes to receive bolts for attaching said wheel to the brake drum, an auxiliary wheel comprising a portion contacting the outer side of said main wheel and having holes registering with said holes of said main wheel, a portion extending from the first portion of the auxiliary wheel and contacting the rim of the main wheel, a portion extending radially outwardly and to one side of the main wheel, a cylindrical portion extending from the outwardly extending portion and of less diameter than the outer diameter of the tire, a portion extending radially inwardly of said cylindrical portion, a cylindrical drum portion of less diameter than said first cylindrical portion, and radial cleats on said drum portion decreasing in height toward the outer end of the drum.

16. In combination, a main tired wheel adapted to be attached to a brake drum on an axle of a vehicle, comprising a tire receiving rim, and a portion formed with bolt holes to receive bolts for attaching said wheel to the brake drum, an auxiliary wheel comprising a portion contacting the outer side of said main wheel and having holes registering with said holes of said main wheel, a portion extending from the first portion of the auxiliary wheel and contacting the rim of the main wheel, a portion extending radially outwardly and to one side of the main wheel, a cylindrical portion extending from the outwardly extending portion and of less diameter than the outer diameter of the tire, a portion extending radially inwardly of said cylindrical portion, a cylindrical drum portion of less diameter than said first cylindrical portion, radial cleats on said drum portion decreasing in height toward the outer end of the drum, and said drum having uncovered openings between the cleats.

17. In combination, a main tired wheel adapted to be attached to a brake drum on an axle of a vehicle, comprising a tire receiving rim, and a portion formed with bolt holes to receive bolts for attaching said wheel to the brake drum, an auxiliary wheel comprising a portion contacting the outer side of said main wheel and having holes registering with said holes of said main wheel, a portion extending from the first portion of the auxiliary wheel and contacting the rim of the main wheel, a portion extending radially outwardly and to one side of the main wheel, a cylindrical portion extending from the outwardly extending portion and of less diameter than the outer diameter of the tire, a portion extending radially inwardly of said cylindrical portion, a cylindrical drum portion of less diameter than said first cylindrical portion, radial cleats on said drum portion decreasing in height toward the outer end of the drum, said drum having uncovered openings between the cleats, and said auxiliary wheel being provided with an inwardly extending flange at the outer end of said drum.

MILTON N. REDMAN.